E. B. CUSHMAN.
CLUTCH.
APPLICATION FILED SEPT. 20, 1920.
1,391,668.
Patented Sept. 27, 1921.
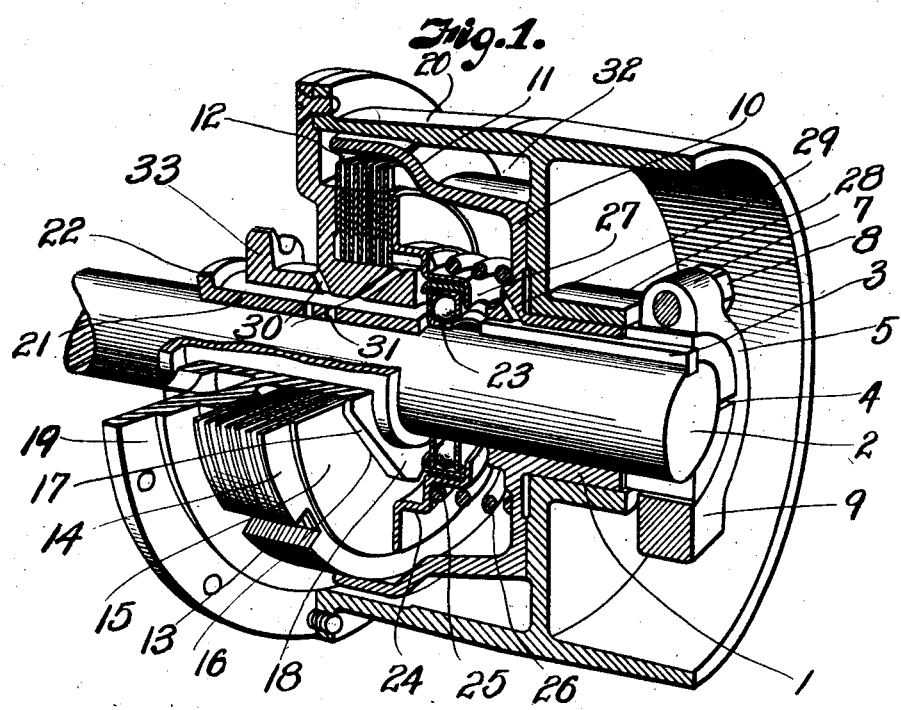
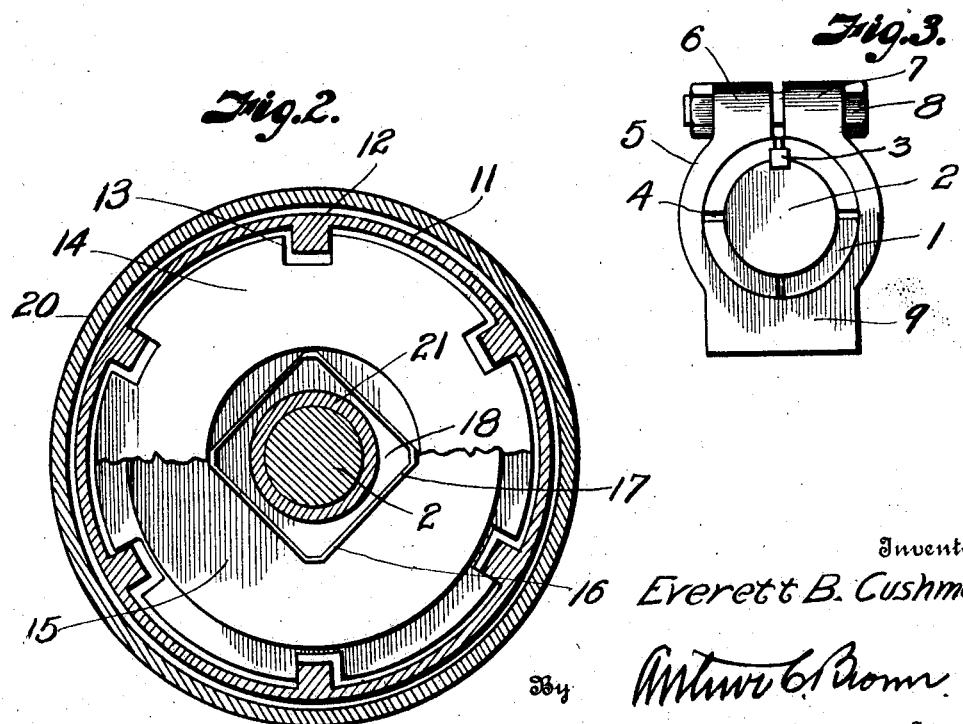
Inventor
Everett B. Cushman
By Arthur C. Brown
Attorney

UNITED STATES PATENT OFFICE.

EVERETT B. CUSHMAN, OF TOPEKA, KANSAS, ASSIGNOR TO THE PIERSEN MANUFACTURING COMPANY, OF TOPEKA, KANSAS, A CORPORATION OF KANSAS.

CLUTCH.

1,391,668.

Specification of Letters Patent.   Patented Sept. 27, 1921.

Application filed September 20, 1920.   Serial No. 411,418.

*To all whom it may concern:*

Be it known that I, EVERETT B. CUSHMAN, a citizen of the United States, residing at Topeka, in the county of Shawnee and State of Kansas, have invented certain new and useful Improvements in Clutches; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to clutches and particularly to means for releasably securing a pulley or the like to a shaft, one of the objects being to simplify the construction of the clutch mechanism to provide for ease of assemblage and to insure efficient performance of the clutch mechanism in operation.

In the drawings,

Figure 1 is a sectional, perspective view of a pulley and clutch constructed in accordance with my invention, the shaft being shown in full lines.

Fig. 2 is a cross sectional view through the clutch mechanism, and

Fig. 3 is an end view showing the means for securing the clutch sleeve to the shaft.

The invention is illustrated as comprising a sleeve member 1, non-rotatably secured upon the shaft 2 by a spline or key 3, which engages complementary grooves in the sleeve and shaft respectively. The outer end of the sleeve 1 is notched or kerfed to provide a plurality of slits 4, whereby the slit end of the sleeve may be contracted about the shaft to secure it thereto. In order to constrict the sleeve end or bind it about the shaft, I have provided a split collar 5 having lugs or projections 6 and 7 with alining openings, through which a clamping bolt 8 may pass to draw the lugs 6 and 7 together to bind the collar about the sleeve. Since the lugs or projections 6 and 7 are offset with respect to the collar, I have provided a counterbalance weight 9 on the collar, diametrically opposite to the lugs 6 and 7. The sleeve 1 is provided with a circumferential web 10 having an offset cup or barrel-shaped flange 11, provided with inwardly projecting lugs 12, which engage notches or recesses 13 in the peripheries of friction disks or laminations 14, interleaving with complementary disks 15 provided with substantially rectangular openings 16, which engage rectangular shaped projections 17 on a cylinder or sleeve 18 integral with a removable end wall 19 of the pulley 20, the cylindrical member 17 being sleeved upon a tubular releaser 21, in turn sleeved upon the shaft 2 and having a collar 22 to be engaged by an actuator whereby the releaser may be shifted longitudinally against the thrust bearing 23, interposed between the end of the releaser and a cup-shaped actuator 24, within the cup 11. The cup-shaped actuator has a spring seat 25 against which one end of a coil spring 26 abuts, the other end abutting against the web 10, as clearly indicated in Fig. 1. The cup-shaped actuator has an inwardly projecting circumferential flange or annulus 27, adapted to contact with the thrust bearing 23, when it is actuated under stress of the expansion spring 26 to force the interleaving laminations or disks into frictional engagement to effect clutch engagement between the shaft and the pulley 20.

The pulley 20 is supported by the tubular member 18 and by a hub flange 28, which is loosely mounted upon the sleeve 1, the longitudinal movement of which is limited by the web 10 and the collar 5, as clearly indicated in Fig. 1.

There are lubricating openings at suitable points in the sleeves, as for example, the lubricating opening 29 in the sleeve 1 and the lubricating openings 30 in the tubular member 18 and corresponding openings 31 in the releaser 21.

The web 10 and the end wall 19 constitute a recess or housing 32, which contains the main elements of the clutch mechanism and protects them from dust, dirt and other foreign substances.

In assembling the clutch mechanism, the releaser 21 may first be sleeved upon the shaft, then the tubular member 18 may be sleeved thereon. The laminations, together with the cup-shaped actuator and the member consisting of the sleeve 1, its web and barrel together with the laminations, may then be assembled and the pulley may be sleeved over the sleeve 1 and secured to the end wall 19, after which the collar 5 may be put in place and clamped to bind the sleeve 1 upon the shaft 2. The expansion spring 26 will normally actuate the actuator to cause frictional engagement between the interleaving laminæ so that the clutch and pulley will be in clutched engagement. This engagement can be relieved, however, by exerting force to impart a longitudinal movement to the releaser sleeve 21, causing it to exert thrust against the thrust bearing 23, which in turn exerts pressure against the flange 27 to compress the spring and relieve the frictional engagement between the laminæ of the respective sets carried by the barrel-shaped member 11 and the tubular member 18. Then the shaft 2 may run idly with respect to the pulley 20, or vice versa, dependent upon which is the driven element.

When pressure against the thrust member 23 is relieved, the expansion spring will again effect clutch engagement between the pulley and the shaft. If desired, the tubular member 18 may contain a sprocket rim 33 so that a sprocket may be substituted for a belt or vice versa.

From the foregoing it will be apparent that a clutch pulley constructed in accordance with my invention may be readily attached to a shaft in such a manner that it may be conveniently held in clutch engagement but temporarily released therefrom, that the parts are simple in construction, well protected, and that the device is adapted to efficiently function for the purpose intended.

What I claim and desire to secure by Letters-Patent is:

1. In combination, a shaft, a sleeve rigidly mounted on said shaft, a cup-shaped member integral with the sleeve, a pulley mounted on the sleeve and having an internal tubular member projecting from one end, interleaving laminations carried by the tubular member and the cup-shaped member respectively, an actuator for normally holding the laminations in frictional contact, an expansion spring interposed between the actuator and one end of the cup-shaped member, and a longitudinally movable releaser for shifting the actuator longitudinally to relieve the frictional contact between the laminations.

2. In combination, a shaft, a sleeve rigidly mounted on said shaft, a cup-shaped member integral with the sleeve, a pulley on the sleeve and having an inturned flange comprising a tubular member mounted about the shaft and extending concentrically within the cup-shaped member, interleaving laminations carried by the cup-shaped member and the tubular member respectively, a spring-pressed actuator within the cup-shaped member and normally exerting force against the laminations to move them into frictional contact, and means for longitudinally shifting the actuator to relieve frictional engagement between the laminations to permit the pulley to rotate independently of the shaft or vice versa.

3. In combination, a shaft, a sleeve rigidly mounted on said shaft, a cup-shaped member carried by the sleeve, a pulley housing inclosing the cup-shaped member, said pulley housing having an inwardly extending, tubular flange, interleaving laminations carried by the tubular flange and the cup-shaped member respectively, an actuator for normally forcing the respective laminations into frictional contact, and means for shifting the actuator out of functional position.

4. In combination, a shaft, a sleeve rigidly mounted on said shaft, a cup-shaped member carried by the sleeve, a pulley housing inclosing the cup-shaped member, an inwardly projecting flange carried by the pulley housing and extending within the cup-shaped member, coöperating clutch members carried by the cup-shaped member and the inwardly extending flange on the pulley housing, a longitudinally shiftable actuator comprising a disk having a spring seat, a flange extending inwardly from the spring seat, a spring interposed between the spring seat and one end of the cup-shaped member, a thrust bearing contacting the inwardly projecting flange of the actuator, and a longitudinally shiftable sleeve member within the inwardly projecting flange of the pulley housing and upon the shaft, the movement of the longitudinally shiftable member in one direction being effective to shift the actuator from functional position.

In testimony whereof I affix my signature.

EVERETT B. CUSHMAN.